United States Patent
Gattrell et al.

(10) Patent No.: US 9,672,967 B1
(45) Date of Patent: Jun. 6, 2017

(54) ELECTROMAGNETIC CART LOCK

(71) Applicant: Honda Motor Co., Ltd., Tokyo (JP)

(72) Inventors: Thomas Gattrell, Anniston, AL (US); Thomas Lecroy, Collinsville, AL (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/078,666

(22) Filed: Mar. 23, 2016

(51) Int. Cl.
*H01F 7/20* (2006.01)
*B62B 5/04* (2006.01)

(52) U.S. Cl.
CPC .......... *H01F 7/20* (2013.01); *B62B 5/049* (2013.01)

(58) Field of Classification Search
CPC .... B62B 7/20; B62B 7/10; B62B 3/02; B62B 3/12; B62D 39/00
USPC ....................................................... 335/289
See application file for complete search history.

(56) References Cited

U.S. PATENT DOCUMENTS

| | | | | |
|---|---|---|---|---|
| 2,943,707 A * | 7/1960 | Ramlose | ............... | B62B 3/148 186/65 |
| 3,083,791 A * | 4/1963 | Shoffner | ............... | A47F 9/045 186/65 |
| 3,335,818 A * | 8/1967 | Thompson | ............... | B62B 3/148 186/63 |
| 3,797,861 A * | 3/1974 | Shoffner | ............... | A47F 9/045 280/33.996 |
| 4,353,564 A * | 10/1982 | Joseloff | ............... | A47F 9/045 186/63 |
| 4,381,870 A * | 5/1983 | Muellner | ............... | A47C 13/00 280/33.993 |
| 4,589,538 A * | 5/1986 | Payraudeau | ............... | G07F 5/06 194/205 |
| 4,733,877 A * | 3/1988 | Pastien | ............... | B62B 3/12 280/33.991 |
| 5,027,924 A * | 7/1991 | Gutmann | ............... | B62B 3/148 186/62 |
| 5,245,895 A * | 9/1993 | Yoshida | ............... | B23P 19/06 81/57.32 |
| 5,385,220 A * | 1/1995 | Pond | ............... | A45C 13/262 190/115 |
| 5,409,245 A * | 4/1995 | Kern | ............... | B62B 3/1476 280/33.996 |
| 5,526,916 A * | 6/1996 | Amdahl | ............... | A47F 10/04 194/211 |

(Continued)

FOREIGN PATENT DOCUMENTS

DE 3932841 A 4/1991
DE 19625525 A 1/1998

*Primary Examiner* — Shawki S Ismail
*Assistant Examiner* — Lisa Homza
(74) *Attorney, Agent, or Firm* — Honda Patents & Technologies North America, LLC; Mark E. Duell

(57) ABSTRACT

A work station in a manufacturing facility includes a cart having four wheels that moves on a floor in the manufacturing facility to deliver parts to the work station. A magnetic locking system for locking the cart at the work station includes a base attached to the floor at the work station, the base having a vertical wall, an electromagnet extending outward perpendicularly from the vertical wall, a damper having a cylinder extending outward perpendicularly from the vertical wall and a piston movable within the cylinder along a horizontal axis through the cylinder and perpendicular to the vertical wall for slowing the cart as the cart approaches the electromagnet, and a limit switch for detecting the cart being adjacent to the vertical wall.

17 Claims, 3 Drawing Sheets

(56) References Cited

U.S. PATENT DOCUMENTS

| | | | | |
|---|---|---|---|---|
| 5,560,187 A * | 10/1996 | Nagashima | | B65B 13/187 |
| | | | | 100/26 |
| 5,823,548 A * | 10/1998 | Reiland | | B62B 3/144 |
| | | | | 280/33.993 |
| 5,836,422 A * | 11/1998 | Hurst | | B62B 3/1484 |
| | | | | 186/63 |
| 5,921,373 A * | 7/1999 | Amdahl | | A47F 10/04 |
| | | | | 194/213 |
| 6,024,203 A * | 2/2000 | Amdahl | | A47F 10/04 |
| | | | | 194/213 |
| 6,033,175 A * | 3/2000 | Pflueger | | B23Q 7/1442 |
| | | | | 414/396 |
| 6,041,894 A * | 3/2000 | Otterson | | B62B 5/04 |
| | | | | 188/19 |
| 6,669,212 B2 * | 12/2003 | Porter | | B62B 3/106 |
| | | | | 280/33.991 |
| 7,290,777 B2 | 11/2007 | Preston et al. | | |
| 7,334,282 B1 * | 2/2008 | Wiseman | | B64F 1/305 |
| | | | | 14/71.3 |
| 7,402,018 B2 | 7/2008 | Mountz et al. | | |
| 7,843,289 B1 * | 11/2010 | Raklyar | | H01H 1/06 |
| | | | | 200/16 R |
| 7,871,234 B2 | 1/2011 | Yuyama et al. | | |
| 8,795,593 B2 | 8/2014 | Nichols et al. | | |
| 9,273,505 B1 * | 3/2016 | Knittel | | E05F 3/02 |
| 2003/0014860 A1 * | 1/2003 | Isogai | | B23Q 17/005 |
| | | | | 29/739 |
| 2003/0026192 A1 * | 2/2003 | Takizawa | | G11B 33/08 |
| | | | | 720/651 |
| 2003/0057752 A1 * | 3/2003 | Cabedo-Deslierres | | B62B 3/1476 |
| | | | | 297/250.1 |
| 2003/0175389 A1 * | 9/2003 | Shaposhnikov | | A23G 3/02 |
| | | | | 426/106 |
| 2003/0213382 A1 * | 11/2003 | Kendale | | B29C 33/10 |
| | | | | 101/41 |
| 2004/0234385 A1 * | 11/2004 | Sticht | | G05B 19/414 |
| | | | | 417/279 |
| 2005/0021602 A1 * | 1/2005 | Noel | | B64D 11/0015 |
| | | | | 709/203 |
| 2006/0278680 A1 * | 12/2006 | Viola | | A61B 17/07207 |
| | | | | 227/176.1 |
| 2008/0178819 A1 * | 7/2008 | Sia | | A01K 31/00 |
| | | | | 119/300 |
| 2011/0163588 A1 * | 7/2011 | Burt | | B62D 51/007 |
| | | | | 298/17 R |
| 2012/0018263 A1 * | 1/2012 | Marking | | F16F 9/065 |
| | | | | 188/266.2 |
| 2012/0049539 A1 | 3/2012 | Sanvik | | |
| 2012/0193393 A1 * | 8/2012 | Viola | | A61B 17/07207 |
| | | | | 227/175.1 |
| 2012/0223121 A1 * | 9/2012 | Viola | | A61B 17/072 |
| | | | | 227/175.1 |
| 2013/0249229 A1 * | 9/2013 | Roberts | | B25J 15/0226 |
| | | | | 294/198 |
| 2014/0040033 A1 * | 2/2014 | Lueken | | G06Q 30/0261 |
| | | | | 705/14.58 |
| 2014/0053472 A1 * | 2/2014 | DeLorean | | A47B 81/00 |
| | | | | 52/29 |
| 2014/0354126 A1 * | 12/2014 | DeLorean | | A47B 51/00 |
| | | | | 312/236 |
| 2015/0208776 A1 * | 7/2015 | Bennett | | A45C 9/00 |
| | | | | 190/15.1 |
| 2015/0216298 A1 * | 8/2015 | DeLorean | | E04B 9/02 |
| | | | | 312/236 |
| 2015/0225008 A1 * | 8/2015 | Pinchas | | B62B 5/005 |
| | | | | 180/12 |
| 2016/0135593 A1 * | 5/2016 | DeLorean | | E04B 9/003 |
| | | | | 52/1 |
| 2016/0185322 A1 * | 6/2016 | Vierkotten | | B66C 23/80 |
| | | | | 701/50 |
| 2016/0278517 A1 * | 9/2016 | DeLorean | | E04B 1/7069 |
| 2016/0339989 A1 * | 11/2016 | Walthert | | B62K 25/04 |
| 2017/0003682 A1 * | 1/2017 | Segman | | B62B 5/0063 |

* cited by examiner

ELECTROMAGNETIC CART LOCK

TECHNICAL FIELD

The embodiments herein are related to mechanical wheeled carts used in a manufacturing facility and a locking system for securing the carts at the work station.

BACKGROUND

Movable wheeled carts are often used in manufacturing facilities to deliver parts from storage area, such as a warehouse, to work stations on the production line. Due to the carts being on wheels, it is necessary to secure the cart at the work station. In the past, mechanical latches were used to secure the cart in place. The mechanical latch would be actuated upon the cart being pushed or moved into a predetermined location. Such mechanical latches, however, are unreliable in that the latch may miss the latching element on the cart when actuated, or the cart may not be moved into the correct position to actuate the latch.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a lock for holding a cart that moves on a floor in a manufacturing facility to deliver parts to a work station includes a base attached to the floor at the work station, the base having a vertical wall, a magnet extending outward perpendicularly from the vertical wall, a damper having a cylinder extending outward perpendicularly from the vertical wall and a piston movable within the cylinder along a horizontal axis through the cylinder and perpendicular to the vertical wall for slowing the cart as the cart approaches the magnet, and a limit switch for detecting the cart being adjacent to the vertical wall.

According to another aspect, a work station in a manufacturing facility includes a cart having four wheels that moves on a floor in the manufacturing facility to deliver parts to the work station. A magnetic locking system for locking the cart at the work station includes a base attached to the floor at the work station, the base having a vertical wall, a magnet extending outward perpendicularly from the vertical wall, a damper having a cylinder extending outward perpendicularly from the vertical wall and a piston movable within the cylinder along a horizontal axis through the cylinder and perpendicular to the vertical wall for slowing the cart as the cart approaches the magnet, and a limit switch for detecting the cart being adjacent to the vertical wall.

According to yet another aspect, a method of securing a wheeled cart at a work station in a manufacturing facility includes the steps of moving the wheeled cart into the work station, slowing the cart by engaging the wheeled cart with a damper on a magnetic locking system, actuating a limit switch on the magnetic locking system in the work station, powering an electromagnet on the magnetic locking system in the work station, and magnetically holding wheeled cart in the work station.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
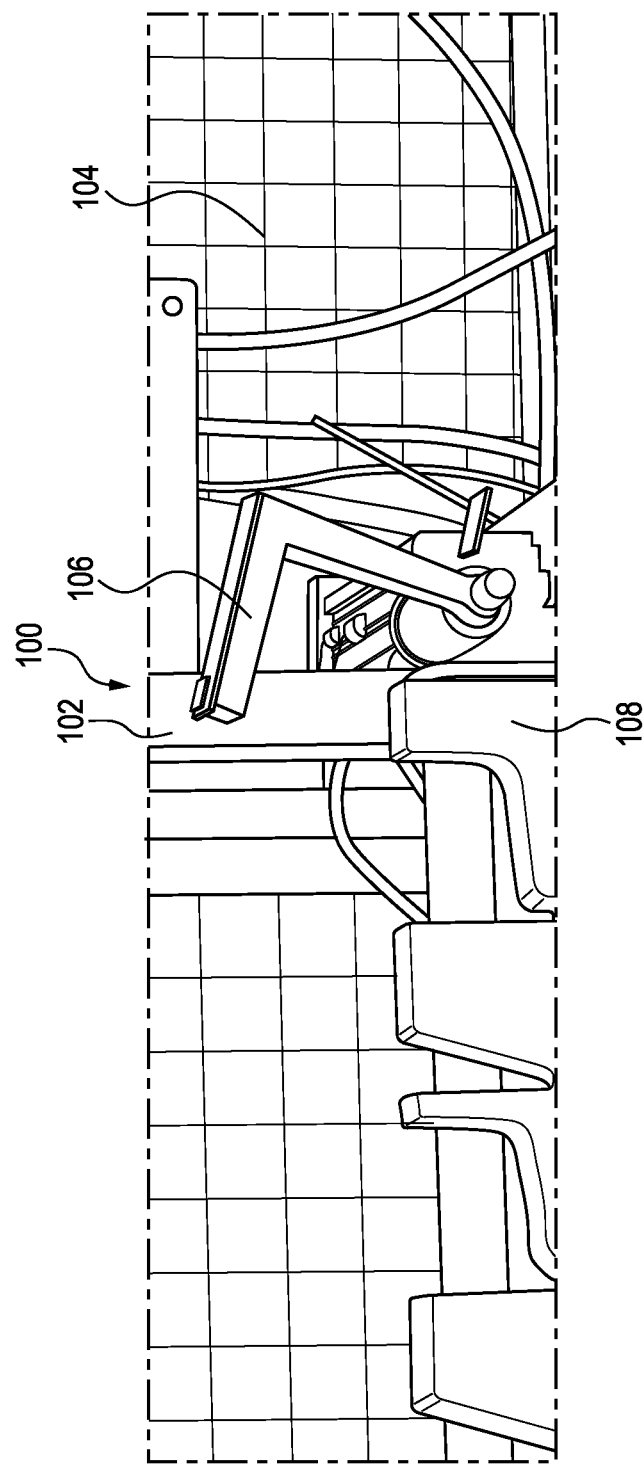
FIG. 1 is a side view of a prior art mechanical latch.

FIG. 1 illustrates a prior art cart and lock system 100 used to lock a cart 102, which is used to carry parts from a storage facility to a work station 104 on the floor of a manufacturing facility, into position at the work station 104. In the prior art cart and lock system 100, mechanical latch 106 that is actuated upon the cart 102 being pushed or moved into a predetermined location. The mechanical latch 106, however, is unreliable in that the latch 106 may miss the latching element 108 on the cart 102 when actuated, or the cart 102 may not be moved into the correct position to actuate the latch 106.

Figure 2:
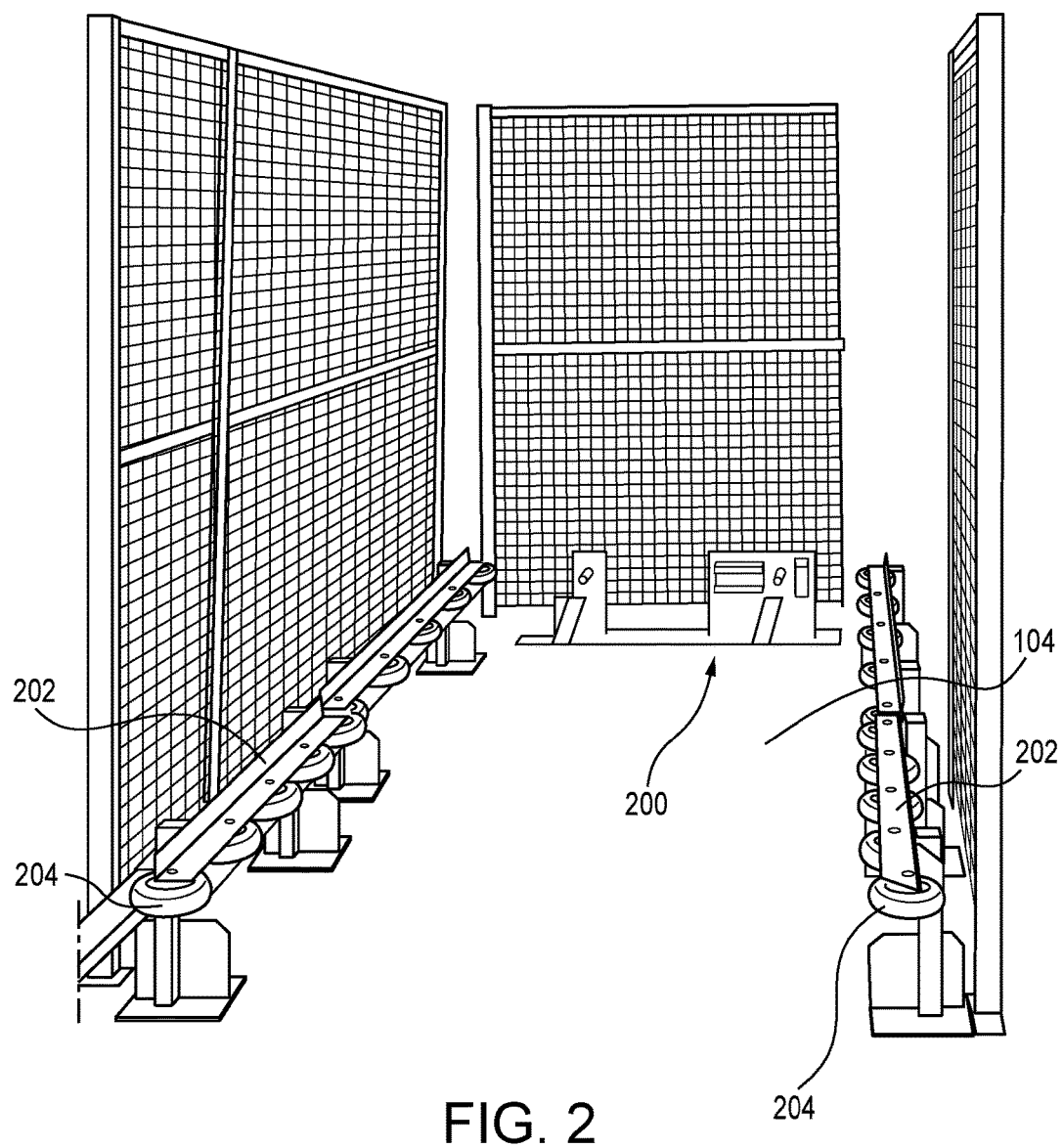
FIG. 2 is a view of a work station in a manufacturing facility.
Figure 3:
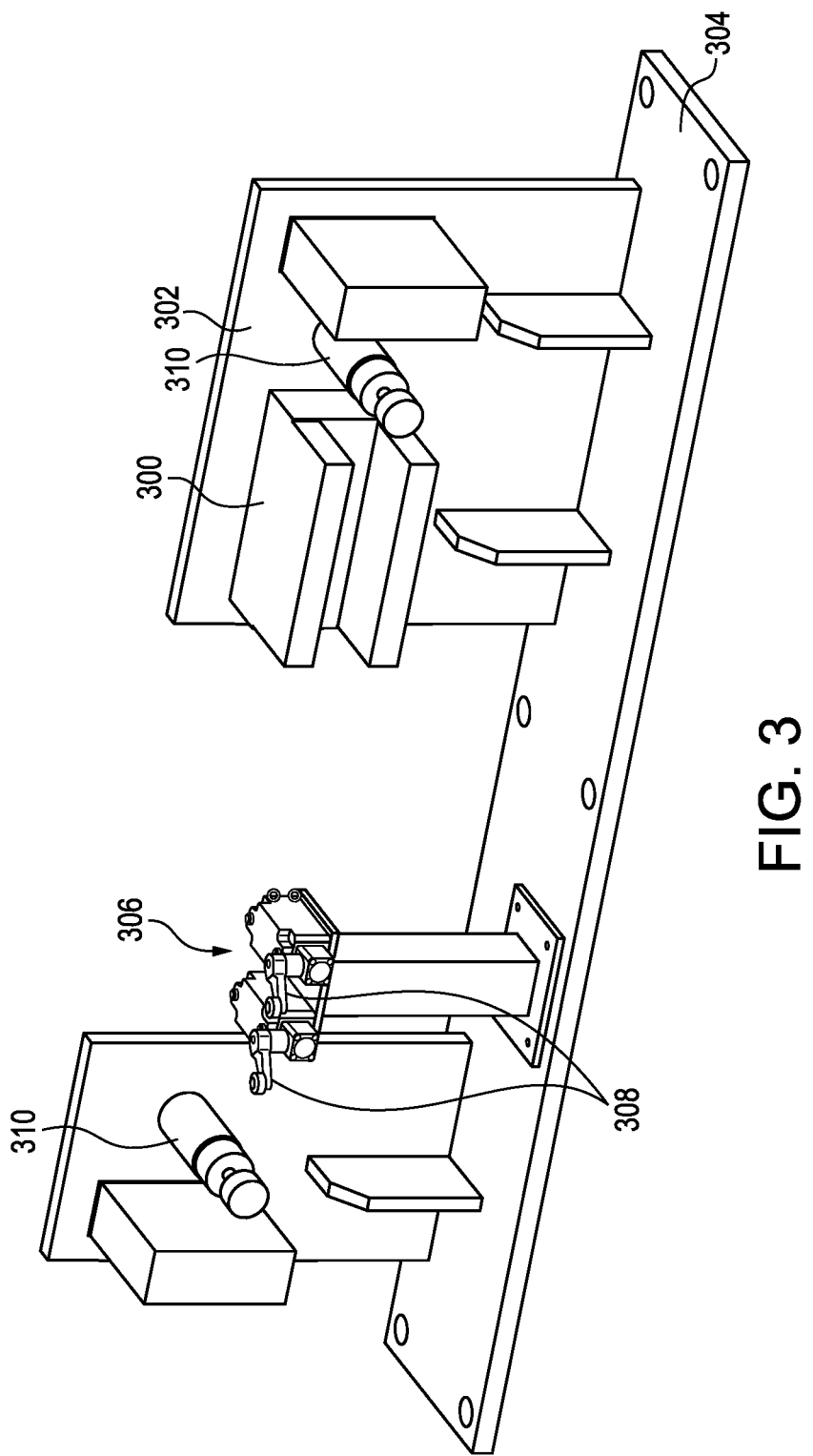
FIG. 3 is a perspective view of a magnetic locking system.

FIGS. 2-3 illustrate an embodiment of a magnetic locking system 200 used to hold a cart 102 in place at a work station 104. The magnetic locking system 200 includes an electromagnet 300 that replaces the mechanical latch 106 of the prior art system illustrated in FIG. 1 to hold the cart 102 in place.

The embodiment illustrated in FIGS. 2-3 uses a 24-volt, bi-polar electromagnet 300 attached to a vertical wall 302 of a base 304. The electromagnet 300 is powered when limit switches 306 are actuated by a cart 102.

The limit switches 306 are electromechanical devices that consist of actuators 308 mechanically linked to a set of contacts (not shown). When the cart 102 comes into contact with the actuators 308, the actuators operate the contacts to make an electrical connection that powers the electromagnet 300. Any known limit switches known to one skilled in the art may be used.

In order to prevent the cart 102 from rebounding off of the electromagnet 300, the magnetic locking system 200 includes at least one, and preferably two, dampers 310. Any known dampers 310 known to one skilled in the art may be used, such as pneumatic or hydraulic shock absorbers in conjunction with springs. The damping force is preferably tuned for the size and weight of the carts 102, when full, used in the manufacturing facility, such that the damper 310 slows the cart to a stop.

The magnetic locking system also includes at least one, and preferable two hard stops 312, which act as fail safes to protect the electromagnet 300 and limit switches 306 in the event of a failure of one or all of the dampers 310. The hard stops 312 are blocks that extend from the wall substantially as far the electromagnet 300. The hard stops 312 may be made of any hardened material, such as rubber, steel, wood, or any other suitable material known to one skilled in the art.

To operate the magnetic locking system 200, a cart 102 is pushed, either by a worker or a robot, into the working station 104. As illustrated in FIG. 2, the working station preferably includes side rails 202 with bearings 204 to guide the cart 102 into position. The dampers 310 slow the cart 102 to a stop adjacent the electromagnet 300. When the cart 102 actuates the limit switch 306, power is supplied to the electromagnet 300, which provides a magnet holding force of up to 1270 lbs. The electromagnet 300 is preferably a bi-polar magnet, which may maintain a holding force of 60 lbs. at 4.5 mm (0.18 inch).

When unloading of the 102 is complete, the electromagnet 300 may be depowered, which will release the cart 102. The cart 102 may then be removed and replaced with a full cart 102.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A lock for holding a cart that moves on a floor in a manufacturing facility to deliver parts to a work station, comprising:
    a base attached to the floor at the work station, the base having a vertical wall;
    a magnet extending outward perpendicularly from the vertical wall;
    a damper having a cylinder extending outward perpendicularly from the vertical wall and a piston movable within the cylinder along a horizontal axis through the cylinder and perpendicular to the vertical wall for slowing the cart as the cart approaches the magnet; and
    a limit switch for detecting the cart being adjacent to the vertical wall.

2. The lock of claim 1 further comprising:
    a hard stop extending outward perpendicularly from the vertical wall.

3. The lock of claim 2 wherein the magnet is an electromagnet.

4. The lock of claim 3 wherein the limit switch actuates the electromagnet.

5. The lock of claim 4 wherein the electromagnet is a bipolar electromagnet.

6. The lock of claim 5 wherein the bipolar electromagnet is a 24-volt bipolar electromagnet.

7. The lock of claim 4 further comprising:
    a second damper having a cylinder extending outward perpendicularly from the vertical wall and a piston movable within the cylinder along a horizontal axis through the cylinder and perpendicular to the vertical wall for slowing the cart as the cart approaches the electromagnet.

8. A work station in a manufacturing facility, comprising:
    a cart having four wheels that moves on a floor in the manufacturing facility to deliver parts to the work station;
    a magnetic locking system for locking the cart at the work station, comprising:
        a base attached to the floor at the work station, the base having a vertical wall;
        a magnet extending outward perpendicularly from the vertical wall;
        a damper having a cylinder extending outward perpendicularly from the vertical wall and a piston movable within the cylinder along a horizontal axis through the cylinder and perpendicular to the vertical wall for slowing the cart as the cart approaches the magnet; and
        a limit switch for detecting the cart being adjacent to the vertical wall.

9. The work station of claim 8 further comprising:
    a hard stop extending outward perpendicularly from the vertical wall.

10. The work station of claim 9 wherein the magnet is an electromagnet.

11. The work station of claim 10 wherein the limit switch actuates the electromagnet.

12. The work station of claim 11 wherein the electromagnet is a bipolar electromagnet.

13. The work station of claim 12 wherein the bipolar electromagnet is a 24-volt bipolar electromagnet.

14. The work station of claim 11 further comprising:
    a second damper having a cylinder extending outward perpendicularly from the vertical wall and a piston movable within the cylinder along a horizontal axis through the cylinder and perpendicular to the vertical wall for slowing the cart as the cart approaches the electromagnet.

15. The work station of claim 14 further comprising:
    first and second side rails having a plurality of bearings that contact the cart;
    wherein the first and second side rails position the cart within the work station; and
    wherein the bearings create a low friction surface on the first and second side rails.

16. A method of securing a wheeled cart at a work station in a manufacturing facility, comprising the steps of:
    moving the wheeled cart into the work station;
    slowing the cart by engaging the wheeled cart with a damper on a magnetic locking system;
    actuating a limit switch on the magnetic locking system in the work station;
    powering an electromagnet on the magnetic locking system in the work station; and
    magnetically holding wheeled cart in the work station.

17. The method of claim 16 further comprising the steps of:
    releasing the wheeled cart by depowering the electromagnet when the wheeled cart is emptied.

* * * * *